United States Patent
Blecha

(10) Patent No.: US 6,685,163 B2
(45) Date of Patent: Feb. 3, 2004

(54) VACUUM VALVE

(75) Inventor: Thomas Blecha, Feldkirch (AT)

(73) Assignee: Vat Holding AG, Haag (CH)

( * ) Notice: Subject to any disclaimer, the term of this patent is extended or adjusted under 35 U.S.C. 154(b) by 64 days.

(21) Appl. No.: 10/085,525

(22) Filed: Feb. 26, 2002

(65) Prior Publication Data

US 2003/0160204 A1 Aug. 28, 2003

(51) Int. Cl.[7] .............................................. F16K 3/16
(52) U.S. Cl. ..................................... 251/328; 251/359
(58) Field of Search ............................... 251/318–334, 251/356–368

(56) References Cited

U.S. PATENT DOCUMENTS

| | | | | |
|---|---|---|---|---|
| 4,044,993 A | * | 8/1977 | Wheeler | 251/334 |
| 4,872,638 A | * | 10/1989 | Thompson et al. | 251/333 |
| 5,143,348 A | * | 9/1992 | Baker et al. | 251/326 |
| 5,901,749 A | * | 5/1999 | Watson | 251/357 |

* cited by examiner

*Primary Examiner*—Paul J. Hirsch

(74) *Attorney, Agent, or Firm*—Reed Smith LLP

(57) ABSTRACT

A vacuum valve comprises a valve body with a valve opening having an axis a closing member which is displaceable between an open position of the valve and a closed position of the valve in a closing direction extending at an angle to the axis of the valve opening, a sealing surface which surrounds the valve opening and which has at least two main portions which are arranged so as to be offset relative to one another in the direction of the axis of the valve opening, are connected with one another by connection portions, and whose imaginary generating lines have at least a portion or a tangent extending substantially vertical to the closing direction, a circumferentially closed seal which is arranged at the closing member and which has two main portions corresponding to the main portions of the sealing surface and connection portions which connect the two main portions, which seal can be placed against the sealing surface by of a displacement of the closing member in the closed position of the valve, wherein at least one of the main portions of the seal has a recess at least along a portion of its length, considered in cross section, on its side facing the sealing surface, and is arranged in a recess of the closing member whose side flanks support the seal laterally, and the corresponding portion of the sealing surface is arranged on a protuberance of the valve body or is provided with a protuberance, wherein the protuberance can be inserted in the recess of the seal when the valve is closed.

10 Claims, 4 Drawing Sheets

VACUUM VALVE

BACKGROUND OF THE INVENTION a) Field of the Invention

The invention is directed to a vacuum valve. The invention relates especially to a vacuum valve comprising a valve body with a valve opening having an axis; a closing member which is displaceable between an open position of the valve and a closed position of the valve in a closing direction extending at an angle to the axis of the valve opening; a sealing surface which surrounds the valve opening and which has at least two main portions which are arranged so as to be offset relative to one another in direction of the axis of the valve opening, are connected with one another by connection portions, and whose imaginary generating lines have at least a portion or a tangent extending substantially vertical to the closing direction; a circumferentially closed seal which is arranged at the closing member and which has two main portions corresponding to the main portions of the sealing surface and connection portions which connect these two main portions of the seal, which seal can be placed against the sealing surface by means of a displacement of the closing member in the closed position of the valve.

b) Description of the Related Art

Slide valves with a valve housing forming the valve body are known. Its valve opening is surrounded by a sealing surface lying in a plane arranged at right angles to the axis of the valve opening. The valve opening is displaceable by a plate-shaped closing member to which a ring seal is secured, this ring seal being arranged in a plane parallel to the plane of the sealing surface. In order to prevent transverse forces acting on the seal, the closing movement is carried out in two steps. First, the plate-shaped closing member is moved into a position which is located opposite the valve opening but is raised from the sealing surface. Subsequently, a portion of the multiple-part closing member carrying the seal is displaced in the direction of the valve opening until the seal contacts the sealing surface. For this purpose, spreading devices, for example, are provided for spreading apart the closing member which is formed of multiple parts. Vacuum valves of this type which have a relatively complicated construction and in which a relatively large quantity of particles is released into the vacuum in an unwanted manner during the closing process, particularly by the movement between the parts of the closing member, are known, for example, from U.S. Pat. No. 4,560,141 or U.S. Pat. No. 4,291,861.

Vacuum valves of the type mentioned in the beginning are known from U.S. Pat. No. 4,881,717, U.S. Pat. No. 4,809,950, and U.S. Pat. No. 5,909,867. The contents of these patents are hereby adopted through reference. The valves taught in these patents have a simple construction, can be opened and closed quickly, wherein transverse forces are prevented from acting upon the seal, and release substantially fewer particles during the closing and opening process compared to the valves described above.

When a differential pressure occurs between the areas on either side of the closing member when the vacuum valve is closed, considerable forces result which cause a certain lateral displacement of the closing member, i.e., in direction of the axis of the valve opening. This lateral displacement is limited in direction of the valve opening by the valve body. A differential pressure strip which is also shown in FIGS. 4 and 5 of U.S. Pat. No. 5,909,867 can be provided for limiting this displacement in the opposite direction. When the closing member strikes the differential pressure strip or the valve body due to a displacement resulting from a differential pressure, there is metal-to-metal contact so that particles are released into the vacuum in an unwanted manner. For this reason, it has already been suggested that the differential pressure strip be provided with a rubber coating. This increases the overall cost of the valve. In FIG. 5 of U.S. Pat. No. 4,809,950 and in FIG. 8 of U.S. Pat. No. 4,881,717, protective edges are provided at the closing member which, in the closed condition, engage in grooves that are arranged in the sealing surface. The protective edges are intended to shield the seal from a flow penetrating the valve opening when the closing member moves in, so as to protect the seal.

SUMMARY OF THE INVENTION

An important object of the invention is to provide a vacuum valve of the type mentioned in the beginning in which a support is provided in a simple manner against a differential pressure acting on the closing member in the closed state of the valve, and in which as few particles as possible are released into the vacuum. Another object of the invention is to provide a vacuum valve of the type mentioned in the beginning which achieves improved protection of the seal relative to influences caused by processes carried out in the vacuum chamber in which the vacuum valve is used, for example, protection against process gases used in the vacuum chamber or plasma generated in the vacuum chamber.

A vacuum valve, according to the invention, comprises a valve body with a valve opening having an axis; a closing member which is displaceable between an open position of the valve and a closed position of the valve in a closing direction extending at an angle to the axis of the valve opening; a sealing surface which surrounds the valve opening and which has at least two main portions which are arranged so as to be offset relative to one another in direction of the axis of the valve opening, are connected with one another by connection portions, and whose imaginary generating lines have at least a portion or a tangent extending substantially vertical to the closing direction; a circumferentially closed seal which is arranged at the closing member and which has two main portions corresponding to the main portions of the sealing surface and connection portions which connect these two main portions of the seal, which seal can be placed against the sealing surface by means of a displacement of the closing member in the closed position of the valve, wherein at least one of the main portions of the seal has a depression or recess at least along a portion of its length, considered in cross section, on its side facing the sealing surface, and is arranged in a recess of the closing member whose side flanks support the seal laterally, and the corresponding portion of the sealing surface is arranged on a protuberance of the valve body or is provided with a protuberance, which protuberance can be inserted in the recess of the seal when the valve is closed.

Improved support is achieved in case of differential pressure by means of the construction, according to the invention, of the seal and of the area of the closing member receiving the seal and of the area of the valve body having the sealing surface, wherein metal-to-metal contact between the closing member and the valve body can be prevented. Further, the portion of the seal arranged in the recess of the closing member is better protected against process gases used in the vacuum chamber and against plasma generated in the vacuum chamber.

In an advantageous embodiment example of the invention, the seal is arranged in a recess in the closing member at least along the greater part of the longitudinal extension of the two main portions and is provided with a recess which receives the sealing surface arranged on a protuberance of the valve body or which receives a protuberance of the sealing surface. In a particularly advantageous embodiment form of the invention, this is carried out over the entire longitudinal extension of the seal or sealing surface. Penetration of aggressive gas particles from the process area to the seal is accordingly slowed down or hindered and the area attacked by the process gases at the seal is minimized. It has also been observed that process gases act more aggressively on areas of the seal subjected to high mechanical stresses than on areas that are less mechanically deformed. According to the invention, however, the highly stressed areas of the seal can be extensively shielded from the influencing process gases.

In order to further slow down or hinder penetration of aggressive gas particles to the seal, at least one groove can be provided in the closing member on at least one side of the seal, which groove extends along the entire length of the seal laterally alongside the seal, and a projection which is provided at the valve body and extends laterally alongside the sealing surface around the valve opening projects into the groove. This effect is further enhanced when two or more such grooves and projections are provided.

In the following, further advantages and details of the invention are described with reference to the embodiment example shown in the drawing, further objects of the invention also following therefrom.

DESCRIPTION OF THE PREFERRED EMBODIMENTS

Like parts in the various embodiment forms are provided with identical reference numbers.

Figure 1:
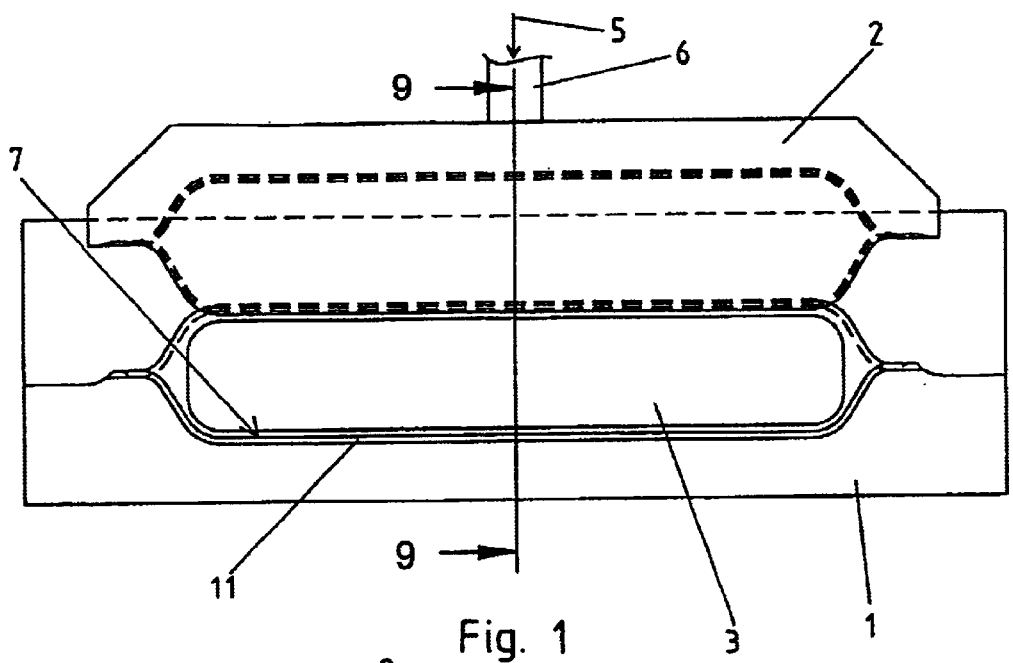
FIG. 1 shows a schematic view of a vacuum valve, according to the invention, in the opened state.
Figure 2:
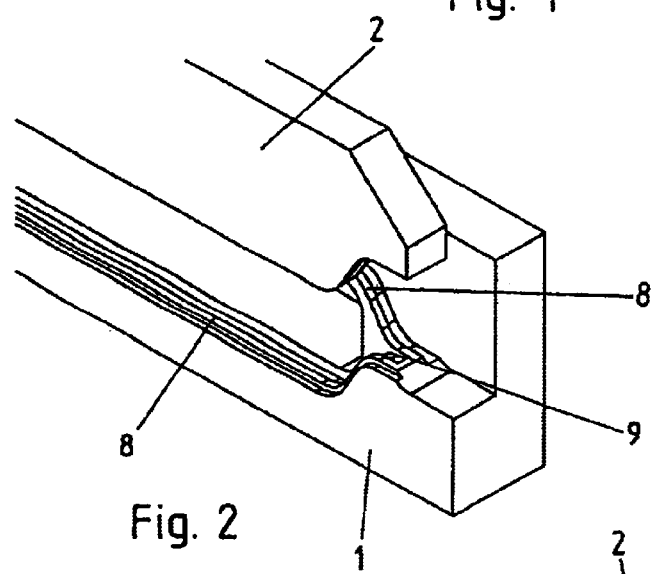
FIG. 2 and FIG. 3 show perspective partial views of the valve of FIG. 1 in an oblique top view and oblique bottom view.
Figure 3:
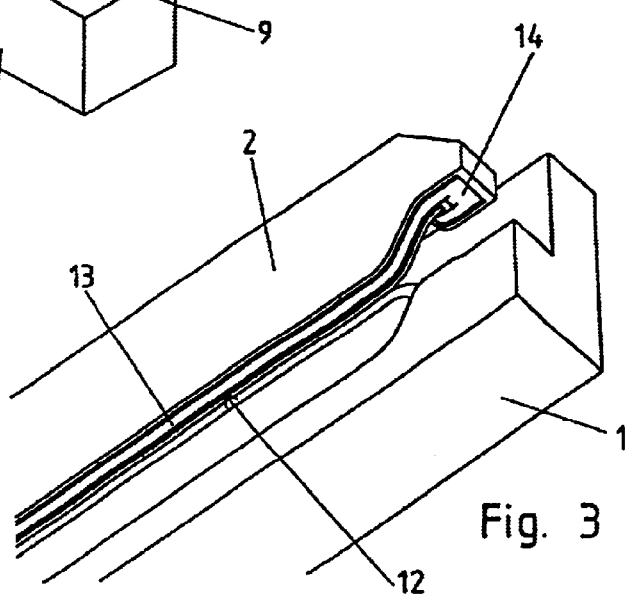
Figure 4:
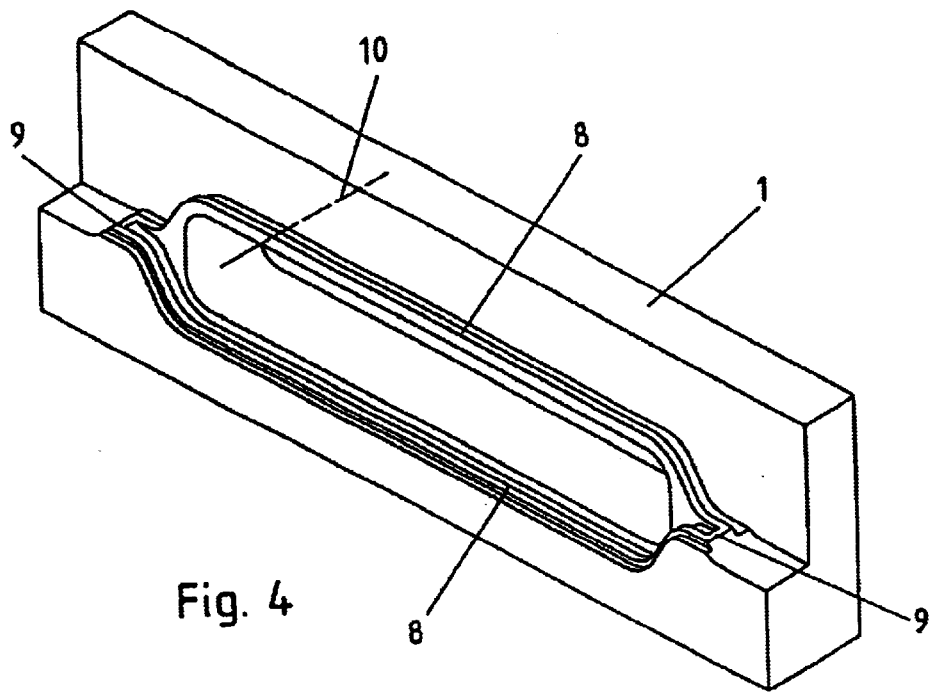
FIG. 4 shows an oblique top view of the valve body in perspective.
Figure 5:
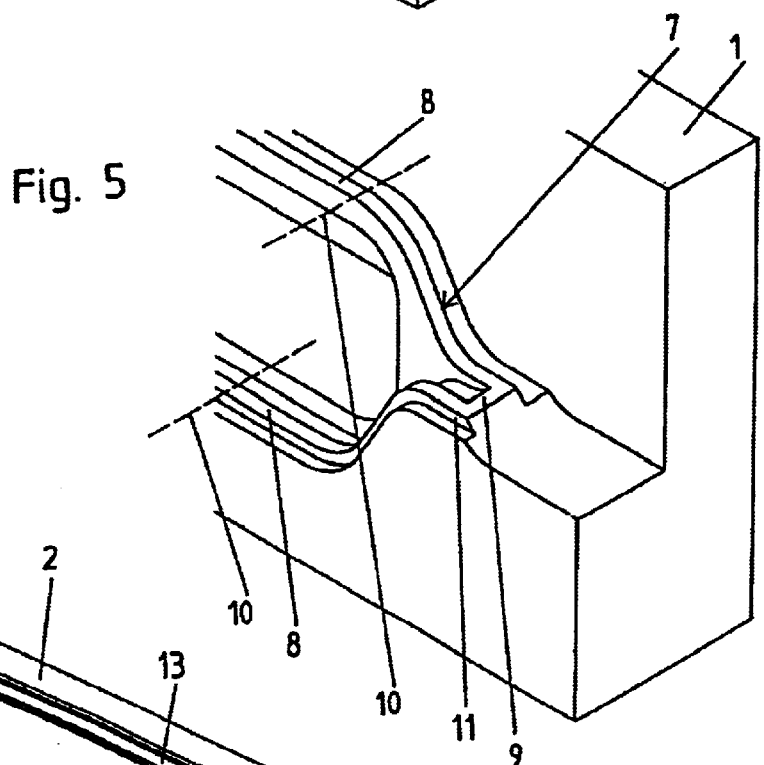
FIG. 5 shows an enlarged section from FIG. 4.
Figure 6:
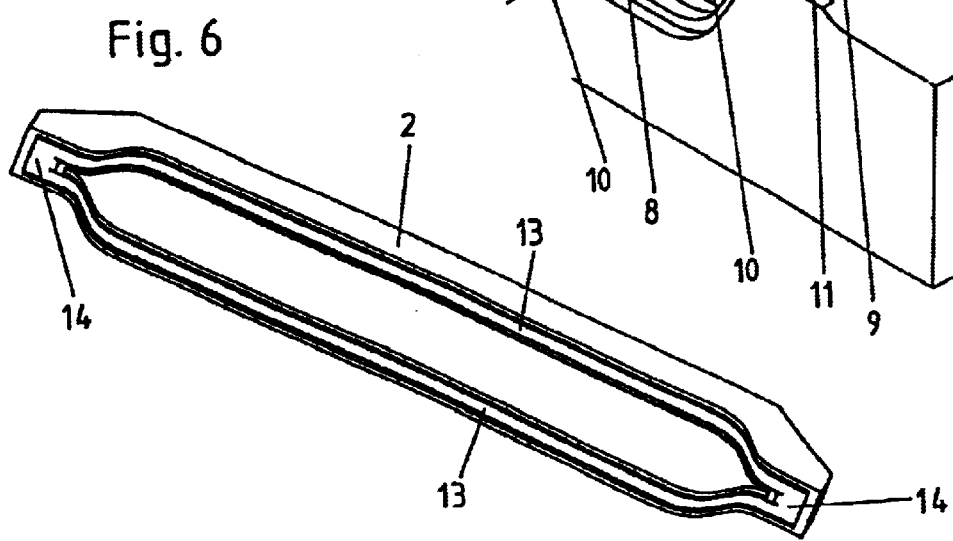
FIG. 6 shows the closing member in a perspective oblique bottom view.
Figure 7:
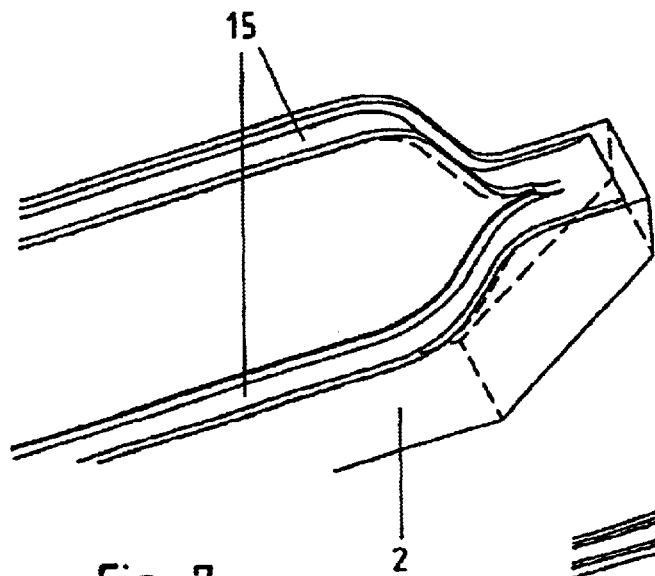
FIG. 7 shows an enlarged detail of the closing member in another oblique bottom view (the closing member is turned), in which the seal has been removed.
Figure 8:
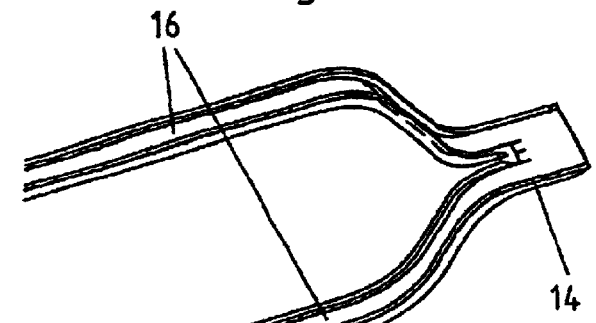
FIG. 8 shows the corresponding portion of the seal.
Figure 9:
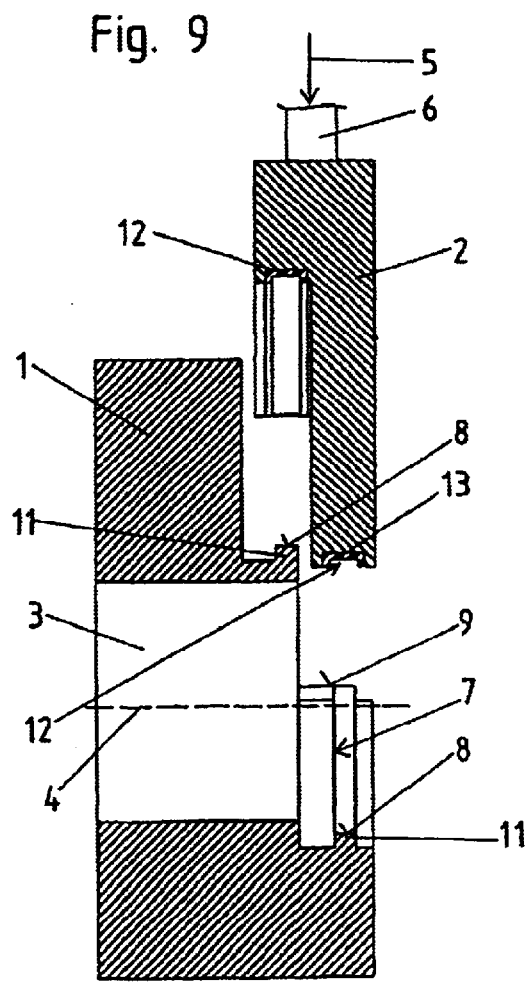
FIG. 9 shows a section along line AA of FIG. 1.
Figure 10:
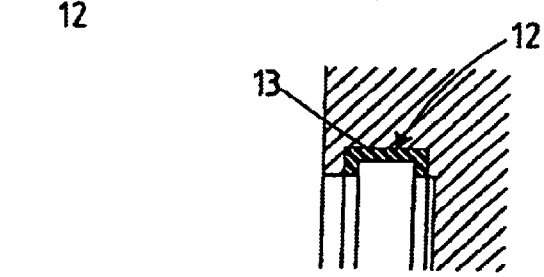
FIGS. 10 and 11 show enlarged details from FIG. 9.
Figure 11:
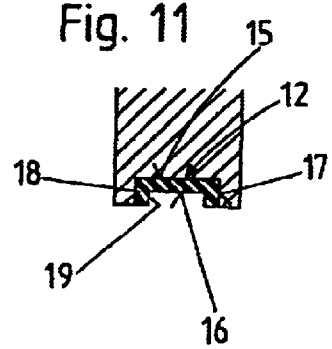
Figure 12:
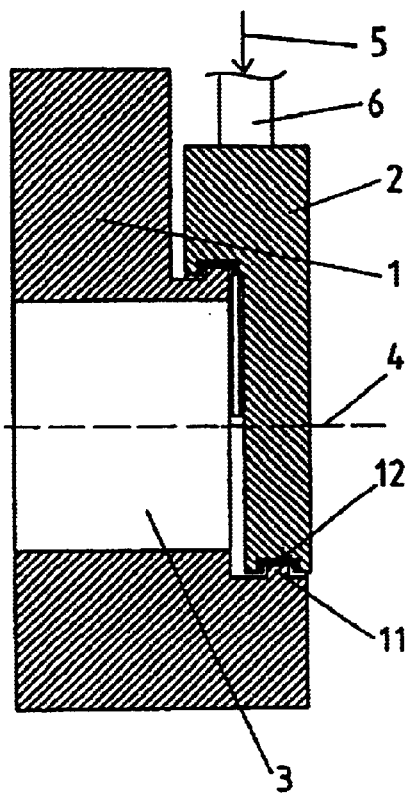
FIG. 12 shows the valve in the closed state in a section corresponding to FIG. 9.

The vacuum valve shown in the drawing has a valve body 1 and a closing member 2. A valve opening 3 with an axis 4 is provided in the valve body. The closing member 2 is displaceable in a closing direction 5 between an open position (FIG. 9) and a closed position (FIG. 12) of the valve. A valve rod 6, shown only partially in the drawing, is provided for this purpose. The valve rod 6 is guided out of the vacuum area in conventional manner by means of a linear leadthrough and can be displaced between the open position of the valve and the closed position of the valve by means of an actuating device. These known parts are not essential to the present invention and are not shown in the drawing and can be constructed, for example, in the manner known from U.S. Pat. No. 4,809,950, U.S. Pat. No. 4,881,717 or U.S. Pat. No. 5,909,867. Various other constructions are conceivable and possible. For example, pneumatic piston-cylinder units connected with the closing member by one or more valve rods can be provided as an actuating device.

The valve body 1 can be formed, for example, by its own housing which can be connected to the flange of a vacuum chamber by a flange. A construction of this kind in which housing parts having a vacuum area between them are provided on both sides of the closing member, the linear leadthrough for the valve rod 6 being provided in this valve housing, is shown in U.S. Pat. No. 4,809,950 for example. The valve housing can also be arranged in the interior of a vacuum chamber, see U.S. Pat. No. 5,909,867. Further, the valve body 1 can also be formed by an interior part of a vacuum chamber as is shown in U.S. Pat. No. 4,881,717. In this case, the linear leadthrough for the valve rod 6 is provided in the vacuum chamber.

The closing direction 5 extends at an angle to the axis 4 of the valve opening 3. In an advantageous embodiment form, the closing direction 5 extends substantially at right angles to the axis 4 of the valve opening. By "substantially" is meant in this case that deviations of up to at least about 25° are taken into account. The closing movement of the closing member 2 is a straight-line movement.

The valve opening 3 which can be constructed circularly or in a different shape is surrounded by a sealing surface 7. This sealing surface 7 has two main portions 8 which lie in planes which are offset laterally, considered in the direction of the axis 4 of the valve opening, and lie vertical to axis 4 in the present embodiment example. The main portions 8 of the sealing surface 7 are arranged in each instance on a protuberance 11 of the valve body 1 and the generating lines 10 of the main portions 8 of the sealing surface 7 extend vertical to the closing direction 5 of the closing member 2. The main portions 8 are connected with one another by connection portions 9 so that the sealing surface 7 overall is U-shaped in the connection area. The connection portions 9 are likewise arranged on the protuberance 11 of the valve body 1. The protuberance 11 is accordingly formed, in its entirety, so as to be circumferentially closed and surrounds the entire valve opening. In the present embodiment example, the connection portions 9 of the sealing surface 7 lie in a common plane and the generating lines 10 of the connection portions 9 are likewise oriented vertical to the closing direction 5.

A circumferentially closed seal 12 is arranged, for example, vulcanized, on the closing member 2. The seal 12 has two main portions 13 which correspond in shape to the main portions 9 of the sealing surface 7. These main portions 13 are therefore likewise arranged in a plane which in the present embodiment example extends vertical to the axis 4. These planes are offset relative to one another in the direction of the axis 4 of the valve opening 3. The main portions 13 of the seal 12 are connected with one another via connection portions 14. In the closed state of the valve, the main portions 13 of the seal 12 contact the main portions 8 of the sealing surface 7 and the connection portions 14 of the seal 12 contact the connection portions 9 of the sealing surface 7, which causes the valve to be sealed.

The main portions 13 of the seal 12 are secured to the closing member 2 in a groove-shaped recess 15. Further, the main portions of the seal themselves have a groove-shaped recess 16. In the present embodiment example, these recesses 15, 16 extend along the entire length of the main portions 13. The seal 12 has a U-shaped form in this area, considered in cross section. The side flanks 17 of the recess 15 support the seal 12 laterally, i.e., in direction of the axis 4 of the valve opening 3. When closing the valve, the protuberance 11 is guided into the recess 16 in the seal by the main portions 8 of the sealing surface 7 arranged thereon. When a differential pressure is present, the side legs 18 of the seal 12 are pressed against the side surfaces of the protuberance 11, so that the closing member 2 is supported. Because of the long longitudinal extension of this support, the occurring surface area pressure is relatively small. Also, the surface attacked by process gases which may possibly be used at the seal is small in the closed state of the closing member and there is no straight-line access to the seal 12. This is also true for plasma generated in the vacuum chamber.

The groove-shaped recess 15 in the closing member 2 also continues over the connection portions 14. In contrast, the connection portions 14 in the present embodiment example have only a very small recess. In other embodiment examples, a larger recess could also be provided in the connection portions.

In the embodiment example shown in FIGS. 1 to 12, the base surface of the recess 16 in the main portions 13 of the seal 12 is flat and is oriented vertical to the closing direction 5. The side flanks 19 of the recess 16 enclose an angle of 90° to the base surface in this case.

Figure 14:
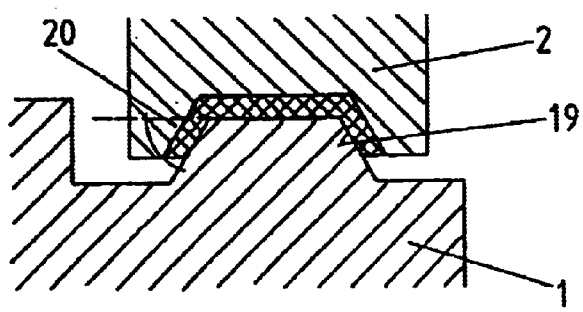

In the embodiment example according to FIG. 14, the base surface of the recess in the seal 12 is likewise flat and oriented vertical to the closing direction 5. In this case, the flanks 19 enclose an angle 20 of about 60° with the base surface. In this embodiment example, the flanks 19 can also be sealing areas as well as contact surfaces. In this case, the sealing surface 7 itself is formed so as to be raised and has side flank portions for contacting the flanks 19 of the recess 16 in the seal 12 and an upper, plane portion for contacting the base surface of the recess 16. The angle between the upper, plane portion and the sealing surface and the side flank portions corresponds to the angle 20 between the base surface and the flanks 19 of the recess in the seal 12. The generating line of this sealing surface accordingly has the shape of the side flanks and upper side of an isosceles trapezoid. The portion of the generating line of the sealing surface corresponding to the upper side of the trapezoid is oriented vertical to the closing direction 5.

Figure 15:
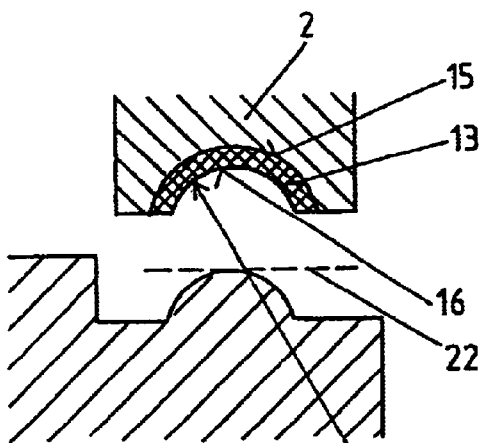
FIG. 14 and FIG. 15 show enlarged sectional views of the seal area in a section corresponding to FIG. 12 of further modified embodiment forms of the invention.

In the embodiment example of the invention shown in FIG. 15, the recess 15 in the closing member 2 is arc-shaped, e.g., approximately semicircular, as is the recess 16 in the seal 12. For the sake of clarity, the closing member 2 is not shown in the completely closed position of the valve. The sealing surface 7 arranged at the valve body 1 is raised in the area of the two main portions 8, the sealing surface 7 being arc-shaped, e.g., approximately semicircular, considered in cross section, and the radius of this circular arc is adapted to the radius of the recess 16 in the seal 12 and is preferably somewhat larger than the latter. The connection portions 14 of the seal 12 and the connection portions 9 of the sealing surface 7 could also be constructed in this manner. The generating line of the sealing surface 7 is accordingly arc-shaped at least in the area in which it has the cross-sectional shape shown in FIG. 15, wherein the generating line has a tangent 22 oriented vertical to the closing direction.

Figure 13:
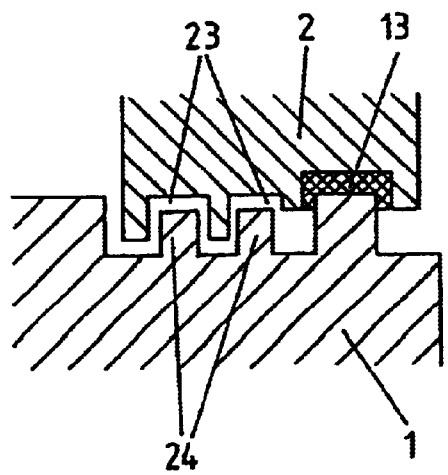
FIG. 13 shows a schematic view of the seal area in a section corresponding to FIG. 12 of a modified embodiment form of the invention.

In the embodiment example shown in FIG. 13, a kind of labyrinth is provided on one side laterally alongside the contact area between the seal and the sealing surface in order to slow down and hinder the escape of particles from the seal area into the vacuum chamber on the one hand and to slow down and hinder penetration of aggressive gas particles from the process area to the elastomer of the seal on the other hand. This labyrinth is arranged at least on the process side, i.e., it faces the vacuum chamber in which processes are carried out using reaction gases or plasma. Two grooves 23 are provided in the closing member 2. These grooves 23 extend along the entire length of the seal or at least its main portions 13 laterally alongside the seal 12. A projection 24 which is provided at the valve body 1 and extends laterally alongside the sealing surface 7 projects into these grooves 23. Instead of two grooves 23 and projections 24, more than two grooves and projections or only one groove and one projection could also be provided; an arrangement of the groove 23 on the valve body 1 and an arrangement of the projection 24 on the closing member 2 are to be considered as equivalent embodiment forms.

Another seal which cooperates with the projection 24 forming the sealing surface can be arranged in one of the two grooves 23, for example, in the groove farther from the seal 12. This additional seal which can completely surround the valve opening and which can be constructed so as to be circumferentially closed serves to protect the outer seal 12. The space between these two seals can also be pumped out.

Various other modifications or different modifications are conceivable and possible without departing from the scope of the invention. For example, the recess 15 could be arranged in the closing member 2 and the recess 16 could be arranged in the seal 12; also, the associated protuberance 11 on which the sealing surface 7 is arranged or the protuberance of the sealing surface 7 could extend over only a portion of the longitudinal extension of the main portions 8, 13 of the sealing surface 7 and seal 12. A construction of this kind is preferable at least over the greater part of the longitudinal extension of the main portions 8, 13. As follows from the preceding description, the imaginary generating lines 10 of the main portions 8 of the sealing surface 7 have at least a portion or a tangent which lies substantially vertical to the closing direction 5. By "substantially vertical" is meant that deviations from the vertical of up to about +/−25° are taken into account.

As will follow from the preceding description, the field of the invention is not limited to the embodiment examples shown herein, but includes their full range of possible equivalents. In particular, a reverse arrangement of the sealing surface 7 and the seal 12 in relation to the valve body 1 and the closing member 2, that is, in which the sealing surface 7 is provided on the closing member 2 and the seal 12 is arranged on the valve body 1, is considered as an equivalent construction. Such an embodiment form is disadvantageous in that it then becomes more difficult to exchange the seal.

While the foregoing description and drawings represent the present invention, it will be obvious to those skilled in the art that various changes may be made therein without departing from the true spirit and scope of the present invention.

What is claimed is:

1. A vacuum valve comprising:

a valve body with a valve opening having an axis;

a closing member which is displaceable between an open position of the valve and a closed position of the valve in a closing direction extending at an angle to the axis of the valve opening;

a sealing surface which surrounds the valve opening and which has at least two main portions which are arranged so as to be offset relative to one another in the direction of the axis of the valve opening and are connected with one another by connection portions and whose imaginary generating lines have at least a portion or a tangent extending substantially vertical to the closing direction;

a circumferentially closed seal which is arranged at the closing member and which has two main portions corresponding to the main portions of the sealing surface and connection portions which connect said two main portions, which seal can be placed against the sealing surface by a displacement of the closing member in the closed position of the valve;

at least one of the main portions of the seal having a recess at least along a portion of its length, considered in cross section, on its side facing the sealing surface, and is arranged in a recess of the closing member whose side flanks support the seal laterally; and the corresponding portion of the sealing surface being arranged on a protuberance of the valve body or is provided with a protuberance, wherein said protuberance can be inserted in the recess of the seal when the valve is closed.

2. The vacuum valve according to claim 1, wherein both main portions of the seal are provided with a recess at least along the greater part of their longitudinal extension and are arranged in a recess of the closing member, wherein the corresponding portions of the longitudinal extension of the sealing surface are arranged on a protuberance of the valve body or are provided with a protuberance, wherein said protuberance can be inserted in the recess of the seal when the valve is closed.

3. The vacuum valve according to claim 2, wherein both main portions of the seal are provided with a recess along their entire longitudinal extension and are arranged in a recess of the closing member, wherein the main portions of the sealing surface are arranged on a protuberance of the valve body or are provided with a protuberance, and said protuberance can be inserted in the recess of the seal when the valve is closed.

4. The vacuum valve according to claim 1, wherein the recess in the seal has a flat base surface which is oriented substantially vertical to the closing direction and is followed by side flanks enclosing an angle between 90° and 40° to the plane of the base surface.

5. The vacuum valve according to claim 1, wherein the recess in the seal is curved, considered in cross section, and the sealing surface has a corresponding curvature.

6. The vacuum valve according to claim 5, wherein the recess in the seal and the corresponding portion of the sealing surface are arc-shaped.

7. The vacuum valve according to claim 1, wherein at least one groove is provided in the closing member at least on one side of the seal, which at least one groove extends along the entire length of the seal or the entire length of the main portions of the seal laterally alongside the seal, and a projection which is provided at the valve body and extends laterally alongside the sealing surface projects into said at least one groove.

8. The vacuum valve according to claim 7, wherein two grooves are provided in the closing member and two projections at the valve body project into said grooves.

9. The vacuum valve according to claim 1, wherein the closing direction extends substantially at right angles to the axis of the valve opening.

10. The vacuum valve according to claim 1, wherein the closing movement of the closing member is a straight-line movement.

* * * * *